*INVENTORS*
ROBERT KIRKMAN
& MORRIS KLINE.
*BY*
William D. Hall.
*Attorney*

July 4, 1950 R. KIRKMAN ET AL 2,513,334

METHOD AND MEANS FOR TRANSFERRING ULTRA HIGH FREQUENCY ENERGY

Filed July 17, 1943 5 Sheets-Sheet 2

*INVENTORS*
ROBERT KIRKMAN
& MORRIS KLINE.
*BY* William D. Hall.
*Attorney*

INVENTORS
ROBERT KIRKMAN
& MORRIS KLINE.
BY William D. Hall
Attorney

INVENTORS
ROBERT KIRKMAN
& MORRIS KLINE.
BY William D. Hall.
Attorney

July 4, 1950 R. KIRKMAN ET AL 2,513,334

METHOD AND MEANS FOR TRANSFERRING ULTRA HIGH FREQUENCY ENERGY

Filed July 17, 1943 5 Sheets-Sheet 5

INVENTORS
ROBERT KIRKMAN
& MORRIS KLINE.
BY William D. Hall.
Attorney

Patented July 4, 1950

2,513,334

UNITED STATES PATENT OFFICE 2,513,334

METHOD AND MEANS FOR TRANSFERRING ULTRA HIGH FREQUENCY ENERGY

Robert Kirkman, Elberon, and Morris Kline, Little Silver, N. J.

Application July 17, 1943, Serial No. 495,220

10 Claims. (Cl. 178—44)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to the transfer of ultra-high frequency energy, and more particularly, to methods and means whereby ultra-high frequency energy may be switched between two terminals, or distributed from any one or more terminals to any one or more of a plurality of other terminals, in succession or in any other predetermined sequence.

It is well known that existing devices for effecting the foregoing operations suffer from certain defects. For example, their physical structure is such as to cause considerable power losses through radiation and sparking, and the power levels at which they can be safely employed are quite low. In addition, they are rather mechanically complex and therefore bulky, and at the same time they are not particularly rugged in construction nor capable of hard use.

It is therefore an object of the present invention to improve methods and means of the general character indicated whereby losses through radiation and sparking are eliminated.

It is another object of the present invention to provide methods and means for switching or distributing ultra-high frequency energy at relatively high power levels.

It is a further object of the present invention to provide ultra-high frequency switching or distributing devices which are simple in construction, thereby making for compactness and dependability; and which are, at the same time, physically rugged, thereby avoiding the necessity for delicate handling and contributing to longer useful life.

These and other objects and advantages, which will become apparent to those skilled in the art as the detailed description progresses, are attained in the present invention in the following manner:

The present invention makes use of the special formations of electromagnetic fields, known as modes of oscillations, which can be set up in resonant cavities. By injecting preselected modes of electromagnetic oscillations into hollow bodies constructed of such dimensions as to resonate at preselected frequencies, and orienting and aligning the input and output devices to and from such bodies so as to dispose the component fields of said modes of oscillations in predetermined planes, and manipulating, at the will of the operator, certain simple elements such as conducting vanes or discs disposed within said component fields or preselected parts thereof, said bodies can be made to become wholly or partially conducting or non-conducting. As a result, ultra-high frequency energy may be switched between a single input terminal and a single output terminal, or such energy may be distributed from one or more input terminals to any one or more of a plurality of output terminals, in succession or in any other predetermined sequence.

More specifically, and in accordance with one embodiment of the present invention, a single mode of electromagnetic oscillations may be injected into a resonant cavity and the resonance of said cavity may be intermittently destroyed to completely suppress propagation, thereby rendering said cavity alternately conducting and non-conducting.

In accordance with another embodiment of the present invention, a single mode of electromagnetic oscillations may be injected into a cavity in more than one radial direction and resonance may be destroyed and propagation suppressed in preselected radial directions while permitting propagation in other radial directions, and the directions of suppression may be interchanged.

In accordance with still another embodiment of the present invention, a single mode of electromagnetic oscillations may be injected into a cavity and preselected parts thereof may be suppressed while permitting the remaining part or parts to travel from the input means to the output means or to a plurality of output means in predetermined sequence.

In the accompanying specification we describe and in the annexed drawings we show several specific embodiments of the switching and distributing mechanisms of the present invention. It is, however, to be clearly understood that such embodiments are merely illustrative and are not intended to limit the true spirit and scope of the present invention as expressed in the claims hereto appended.

Figure 1:
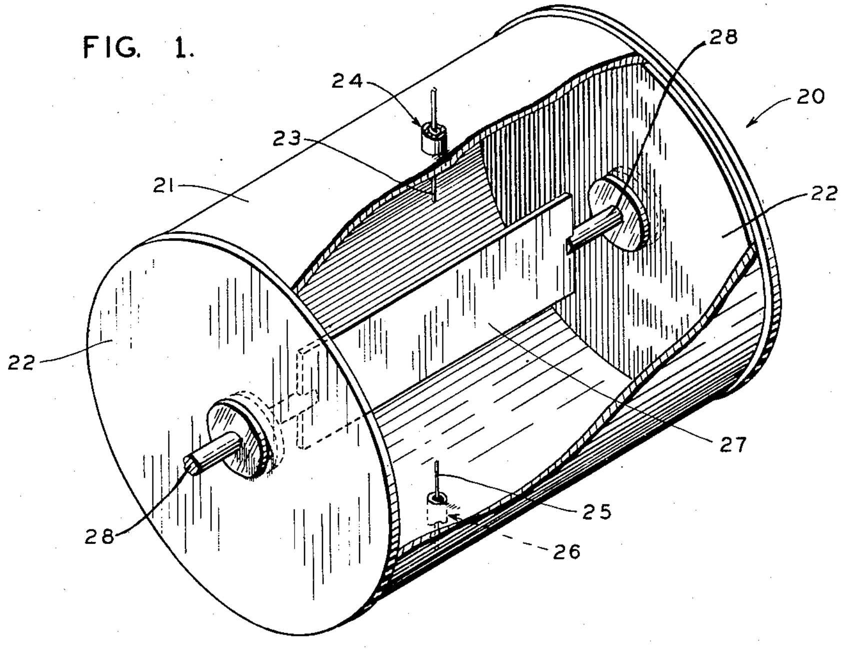
Figure 1 is an isometric view of one form of ultra-high frequency transfer device made in accordance with the principles of the present invention, said device being partially broken away to show the inner construction.

Referring now more in detail to the form of the present invention illustrated in Figure 1, the numeral 20 generally designates a hollow body, known in the art as a pure cylindrical cavity resonator. Such a resonator consists of a cylindrical conducting wall 21, closed at both ends by circular conducting plates 22, the cross-sectional and longitudinal dimensions thereof depending upon the frequency at which it is intended that the same resonate. The specific dimensions of the resonator constitute no part of the present invention and may be calculated, in a manner and by formulae well known in the art, to result in a body which will be capable of resonating at a predetermined ultra-high frequency.

While we have shown a pure cylindrical cavity, it is to be understood that we are not limited to this type and any other appropriate shape or form may be utilized with the same results.

Extending into the resonator 20, through the wall 21 thereof, is an input or injector rod 23, constituting an elongation of the inner conductor of a co-axial cable 24 adapted to be connected with a source of ultra-high frequency energy and convey the same to the resonator, the outer conductor of said cable being electrically connected to the conducting wall 21 and the distance to which the injector extends into the cavity being determined by the desired degree of coupling between the cable and resonator. While we have shown a co-axial cable and a straight rod type of injector for conveying and injecting energy into the resonator, it is to be clearly understood that we are not limited to either this form of conductor or this form of injector.

Also extending into the resonator 20, through the wall 21 thereof, and positioned at the opposite end of the diameter of the resonator which includes the injector rod 23, is an output rod 25, like the rod 23, preferably constituting an elongation of the inner conductor of a co-axial cable 26 which may be connected with, so as to deliver energy to any desired load. Here again, we do not wish to be limited to either a rod type output or a co-axial output cable. It will be noted that the rod 23 has been designated as the input and the rod 25 as the output. Obviously, the functions of these two members may be interchanged.

Figure 2:
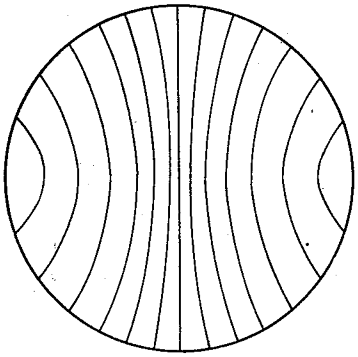
Figure 2 is a transverse view of the electric field of the mode of oscillation known as the $TE_{111}$ mode, which is particularly well adapted for use with the device shown in Figure 1.
Figure 3:
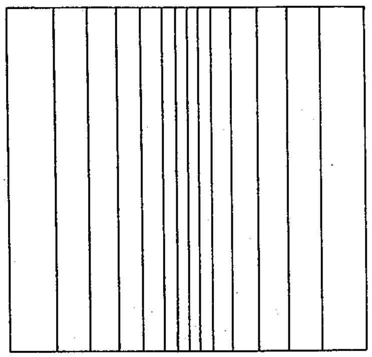
Figure 3 is a longitudinal view of the same.

By utilizing the type of input and output device shown and orienting the same with respect to the resonator and with respect to each other as described, the application of ultra-high frequency energy to the resonator results in exciting the same with the mode of electromagnetic oscillations known in the art as the $TE_{111}$ mode. As may be seen from an examination of Figures 2 and 3 of the drawings, wherein, for the sake of clarity, the magnetic component of the mode has been omitted and only the transverse electric field thereof has been shown, such electric field includes one full-period variation in intensity in swinging a radius through 360°, one half-period variation along said radius and one half-period variation along the axis of the cylinder.

As long as the field remains undistorted as described, the cavity is in a conducting condition and the energy injected into the resonator by the input 23 may be extracted therefrom through the coupling between said field and the output 25. However, should the field be distorted, the cavity will no longer be resonant to the injected mode, and the propagation therein of said mode will be suppressed. As a result, the cavity will cease conducting and no further energy will be transferred from the input 23 to the output 25. Thus, the resonator becomes a switch.

In order to obtain this result, we provide the resonator with a vane 27 consisting of a rectangular strip of conducting material carried intermediate a pair of stub shafts 28 made of a suitable dielectric material such as polystyrene, said shafts being rotatably mounted in the end plates 22 whereby the plane of the vane 27 may be disposed, at the will of the operator, parallel or normal to the plane of the electric field of the injected mode.

As long as said vane is normal to the electric field, the electrostatic lines will pass therethrough without distortion and the resonator will remain conducting, but as soon as said vane is rotated into a position parallel to said field, boundary conditions which tend to cause electrostatic lines of force to meet a surface at right angles thereto, will distort the path of said field, thereby destroying the resonant condition of the device and rendering the same non-conducting. Obviously the result will be to interrupt the transfer of energy to the output terminal.

It is to be noted that intermediate positions of the vane will only partially destroy resonance so that the device, in addition to constituting a switch for ultra-high frequency energy, can be utilized as a variable attenuator.

Figure 4:
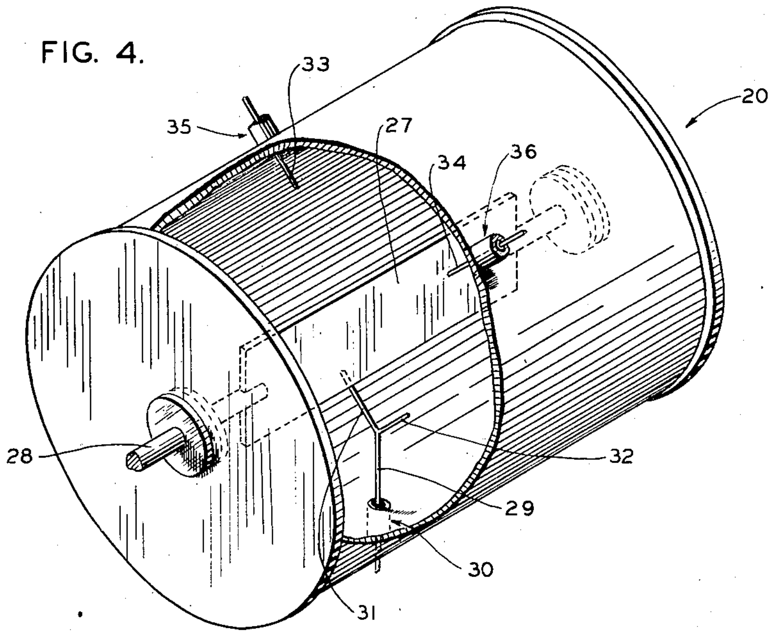
Figure 4 is an isometric view of a modified form of ultra-high frequency transfer device, said device also being partially broken away to show the inner construction.
Figure 5:
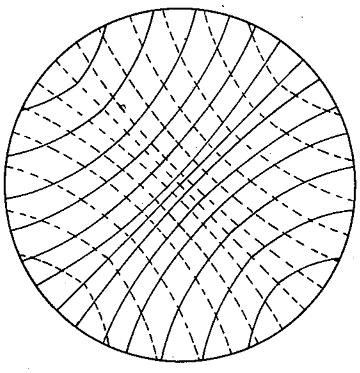
Figure 5 is a transverse view of the electric fields of two $TE_{111}$ modes in quadrature, said arrangement being particularly suited for use in a device such as that of Figure 4.

If it is desired to use the resonator 20 to feed the energy injected therein alternately to two output terminals, the modification set forth in Figure 4 may be used. In this modification, the structure of the resonator itself is exactly the same as that shown in Figure 1, but the input means is altered to inject the same $TE_{111}$ mode of electromagnetic oscillations in two different radial directions so that the electric fields thereof are disposed at right angles to each other, as shown in Figure 5, wherein the lines indicating one field are solid and the lines indicating the other are broken. In addition, the output means includes two terminals which are oriented in such manner that each terminal is coupled with the input through one field only.

As may be seen in Figure 4, the input terminal may consist of an extension 29 of the inner conductor of a co-axial cable 30, said extension terminating in two injector arms 31 and 32 diverging at right angles to each other, and the output terminals may consist of extensions 33 and 34 respectively of the inner conductors of co-axial cables 35 and 36, the extensions 33 and 34 lying in planes parallel respectively to the arms 31 and 32.

By rotating the vane 27 so that it is in a plane parallel to the injector arm 32 and output terminal 34 and normal to the injector arm 31 and output terminal 33, the electric field of the injected mode which is parallel to the vane is distorted, propagation in that particular radial direction is suppressed, and no energy is transferred from the input means to the output terminal 34, although the field which is normal to the plane of the vane remains undisturbed and energy is transferred from the input means to the output terminal 33.

Thus, energy from the input can be fed alternately to two output terminals, and it will be understood, vice versa.

In the case where it is desired to distribute energy from a single input means to more than two output terminals or vice versa, we have found it more efficient to employ a different type mode of oscillations and a different type of resonator, namely the $TE_{211}$ mode in a co-axial cylinder.

Figure 6:
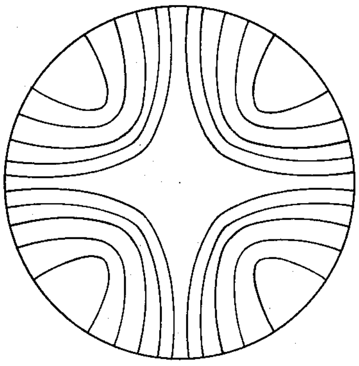
Figure 6 is a transverse view of the electric field of the mode of oscillation known as the $TE_{211}$ mode as it appears in a pure cylindrical cavity.
Figure 7:
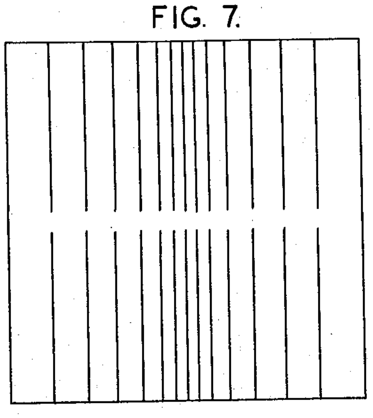
Figure 7 is a longitudinal view of the same.
Figure 8:
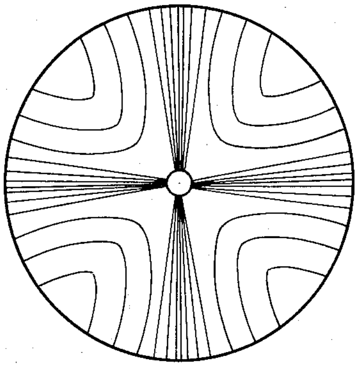
Figure 8 is a transverse view of the electric field of the $TE_{211}$ mode as it appears in a pure coaxial cavity.
Figure 9:
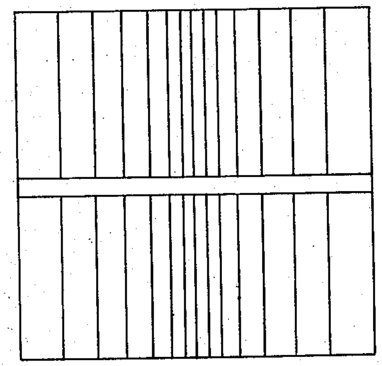
Figure 9 is a longitudinal view of the same.
Figure 10:
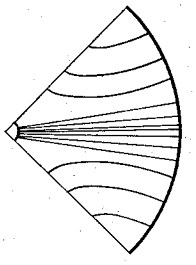
Figure 10 is a transverse view of a quadrant of the $TE_{211}$ co-axial mode shown in Figure 8.

Attention is directed to Figures 6 and 10 inclusive of the drawings. In Figures 6 and 7, respectively transverse and longitudinal views of the electric field of the $TE_{211}$ mode as the same exists in a pure cylindrical cavity, it will be noted that there are two full-period variations in field intensity in swinging a radius through 360°, one half-period variation along the radius and one half-period variation along the axis of the cylinder. By introducing a co-axial conductor into the cylinder the field concentration becomes altered as shown in Figures 8 and 9. It has been found that by employing this type of concentration the entire field can be divided into quadrants or other sectors and resonance maintained in any one or more quadrants as if the remaining sectors did not exist, as shown in Figure 10. In the embodiment of the present invention now to be described, we make use of this phenomenon.

Reference is made to Figures 11 to 14 inclusive. As there shown, the numeral 37 generally designates a cavity resonator consisting of a cylindrical conducting wall 38 closed at both ends by circular conducting plates 39 and 40. Rotatably mounted in the plates is a co-axial shaft 41, and secured to the plate 39, exterior of the cavity, is a conical member 42 which constitutes a flared extension of the outer conductor 43 of a co-axial cable 44 adapted to be connected with a source of ultra-high frequency energy. The cable 44 includes an inner conductor 45 dividing within the conical member 42, into four branches at right angles to each other, of which only two, designated 46 and 47 are shown in the drawings (Fig. 13), the ends of each branch passing through the plate 39 to connect with an injector rod, only two, designated 48 and 49 being shown. The axes of the four injector rods are perpendicular to the axis of the cylinder. By employing an arrangement such as this, to which it is to be clearly understood the present invention is not limited, the $TE_{211}$ co-axial mode of electromagnetic oscillations shown in Figures 8 and 9 may be propagated within the resonator 37.

The output means may comprise a plurality, here shown as four, of co-axial cables 50, 51, 52, 53, corresponding to the four injector rods, each cable having a pick-up extension entering the wall 38 of the resonator, and said cables being preferably disposed at 90° intervals with respect to each other in planes normal to the axis of the resonator. By such an arrangement, energy injected into the resonator is equally distributed among the output terminals, and we now describe the manner in which said energy may be restricted to preselected output channels.

Extending radially from the shaft 41 is a plurality, here shown as three, of conducting vanes 54, 55, 56, the vanes 54 and 55 being spaced 90° with respect to each other and the vane 56 being spaced 135° with respect to each of the other vanes. Between the vanes 54 and 56 and the vanes 55 and 56, we provide conducting partitions 57 and 58 which lie in a plane at right angles to the axis of the resonator. These partitions destroy resonance and suppress propagation in those parts of the cavity bounded by the vanes 54 and 56 and the vanes 55 and 56, leaving only the quadrant between the vanes 54 and 55 in condition to permit the existence of the resonant mode. Obviously, by rotating the shaft 41 and the vanes and partitions carried thereby, the radial position of the conducting sector of the cavity may be varied, thereby enabling the transfer of energy from the input terminals or injectors to any one of the output cables 50 to 53 inclusive, at the will of the operator. In order to permit the vanes to pass the output terminals which extend into the cavity each of said vanes may be provided with a clearance slot 59.

Figure 15:
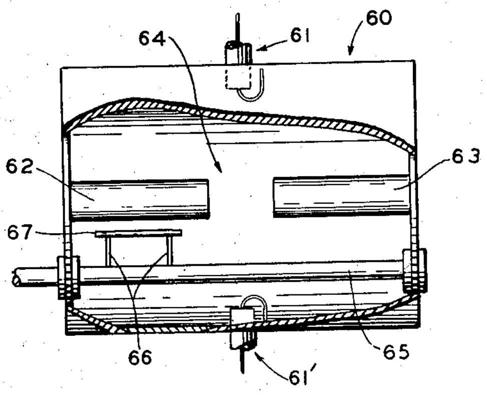
Figure 15 is a partial side elevational, partial longitudinal sectional view of a hybrid type of ultra-high frequency device constituting still another modification of the present invention.
Figure 11:
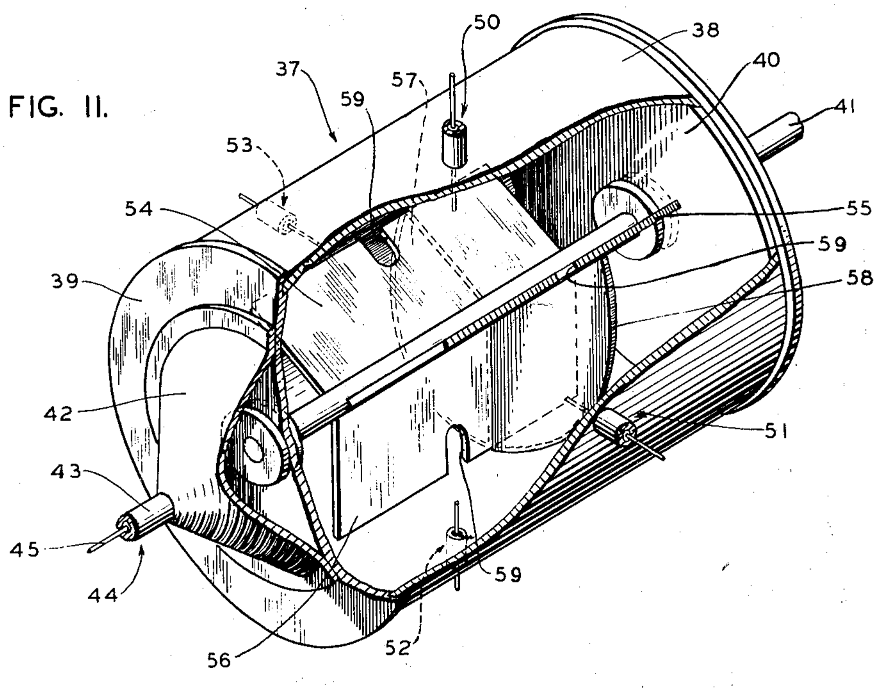
Figure 11 is a partially broken, isometric view of another modification of the ultra-high frequency devices of the present invention, this form being adapted to utilize the $TE_{211}$ mode shown in Figures 8, 9, and 10.
Figure 12:
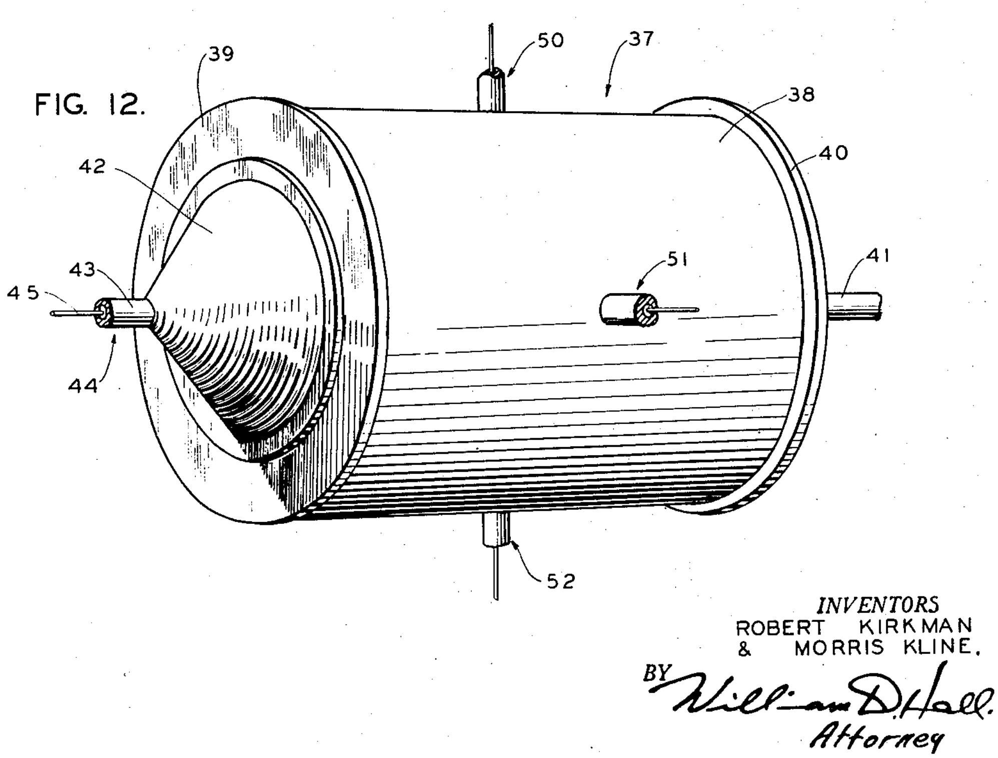
Figure 12 is a perspective view of the same.
Figure 13:
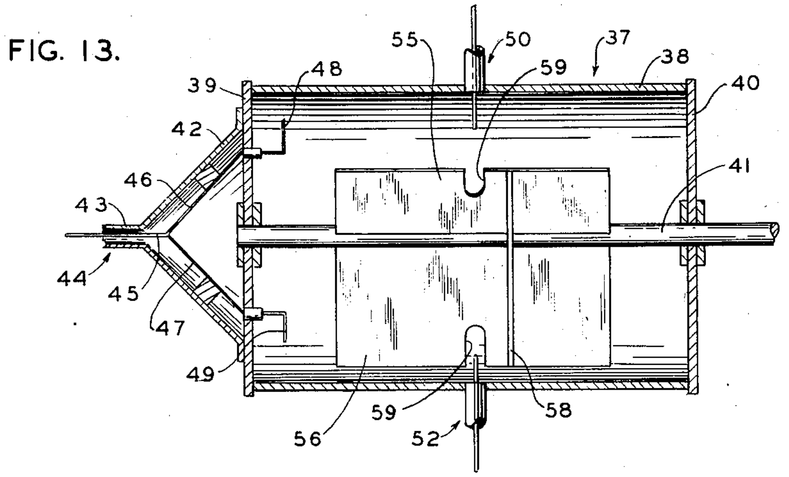
Figure 13 is a longitudinal sectional view of the embodiment of Figure 11.
Figure 14:
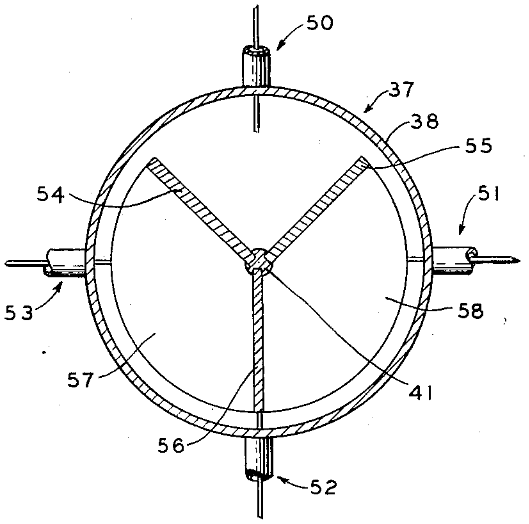
Figure 14 is a transverse sectional view of the same.

We come now to the description of the final embodiment of the present invention, shown in Figure 15. This form, like that shown in Figure 1, constitutes a switch or variable attenuator for controlling the transfer of energy between only two points. As may be seen in said Figure 15, a resonator 60, similar to those previously described, is provided with loop type input and output terminals 61 and 61'. Co-axially disposed in the resonator and extending therein from the end plates thereof, is a pair of conducting rods 62 and 63, the inner, facing ends of said rods being separated by a space 64. The distributed inductance and capacitance of the resonator body obviously determines the frequency at which the cavity will resonate and if said inductance and capacitance is altered, the resonant condition will be disturbed. For this purpose there may be rotatably mounted in the resonator, offset with respect to the axis thereof, a dielectric shaft 65, said shaft carrying, through dielectric supporting members 66, a short conducting rod 67, the arrangement being such that the movement of the rod 67 toward or away from the rod 62 will change the inductance and capacitance of the cavity and therefore affect the propagation of the mode injected therein. We thereby provide a simple and effective means for controlling the transfer of energy from the input terminal 61 to the output terminal 61', or vice versa. Intermediate positions of the rod 67 with respect to the rod 62 will only partially affect resonance so that, as with the embodiment of Figure 1, this form has application as a variable atenuator.

This completes the description of the present invention and it is to be noted from all of the foregoing that by means of the various embodiments thereof ultra-high frequency energy may readily be switched between two terminals, or may be distributed from one or more terminals to any one or more of a plurality of other terminals, in succession or in any other predetermined sequence. It will further be noted that no make-and-break contacts are employed, thereby eliminating spark-over; and the inherent characteristics of the devices, which consist, basically, of cavity resonators, prohibit radiation and permit the handling of the energy at high power levels. Furthermore, the structures employed are simple, thereby assuring dependability, and their physical make up is such as to enable hard use.

We claim:

1. A radio frequency energy switching device comprising a cavity resonator shaped to have a major axis, input coupling means for exciting said resonator with electromagnetic energy in a distribution pattern that is characterized by at least two identical modes equally spaced about said axis, at least two output coupling means mounted to be linked one to the energy in each of said modes, and a rotatable vane structure positioned along said axis and mounted to rotate about said axis for successively suppressing the electromagnetic energy in all but one of said modes.

2. A switching device according to claim 1 in which said input coupling means comprises two probes mounted in said resonator perpendicular to one another in a plane perpendicular to said axis, said output coupling means comprises two probes mounted in said resonator parallel respectively to said input probes, and said rotatable vane structure comprises a flat conductive sheet.

3. A switching device according to claim 1 in which said input coupling means comprises four probes mounted in said resonator perpendicular to one another in a plane perpendicular to said axis, said output coupling means comprises four probes mounted in said resonator parallel respectively to said input probes, and said rotatable vane structure comprises three flat conductive sheets mounted with an edge of each connected to an edge of the others along said axis, two of said sheets being spaced 45° from one another and the remaining one of said sheets being spaced 135° from both of said first-mentioned sheets.

4. A switching device according to claim 1 in which said input coupling means comprises an even number of probes mounted in said resonator in a plane perpendicular to said axis and arranged radially with respect to said axis and equally spaced circumferentially from one another, said output coupling means comprises a similar number of probes mounted parallel to said input probes, and said rotatable vane structure comprises a plurality of flat conductive sheets mounted with an edge of each connected to an edge of the other along said axis, two of said sheets being angularly spaced from each other by an amount equal to the spacing between said input probes, the remaining ones of said sheets being positioned to suppress all oscillations external to the space between said first-mentioned sheets.

5. A radio frequency energy switching device comprising a cavity resonator shaped to have a major axis, input coupling means for exciting said resonator with electromagnetic energy in a distribution pattern that is characterized by a plurality of identical modes equally spaced about said axis, said modes defining an equal plurality of sections about said axis, a plurality of output coupling means mounted one in each of said sections, and a rotatable vane structure positioned along said axis and mounted to rotate about said axis for successively suppressing the electromagnetic energy in all but one of said sections.

6. A radio frequency switch comprising a closed cylindrical cavity resonator, input coupling means including at least two probes mounted in said resonator in a plane perpendicular to said axis and oriented perpendicular to one another for exciting said resonator with electromagnetic energy in a distribution pattern that is characterized by at least two identical modes equally spaced about said axis, at least two output coupling probes mounted parallel to said input probes so as to be linked one to the energy in each of said modes, and a rotatable vane structure including at least one flat conductive sheet positioned alonge said axis and a dielectric rod rotatable mounting said sheet to rotate said sheet about said axis for successively suppressing the electromagnetic energy in all but one of said modes.

7. Means for transferring high frequency energy comprising, a cavity resonator, input means for injecting a predetermined mode of electromagnetic oscillations into said resonator, output means oriented to be linked with at least one of the component fields of said mode of oscillations for extracting therefrom the energy contained therein, means mounted for axial rotation in said resonator for isolating a selected quadrant of the confined space thereof, and means carried by said isolating means for distorting at least one of the component fields of said mode of oscillations to suppress the propagation thereof in the space exterior of said selected quadrant.

8. Means for transferring high frequency energy comprising, a cavity resonator, input means for injecting a predetermined mode of electromagnetic oscillations into said resonator, output means oriented to be linked with at least one of the component fields of said mode of oscillations for extracting therefrom the energy contained therein, a plurality of conducting vanes mounted upon a dielectric shaft for axial rotation in said resonator for isolating a selected quadrant of the confined space thereof, and a plurality of conducting partitions carried by said vanes for distorting at least one of the component fields of said mode of oscillations to suppress the propagation thereof in the space exterior of said selected quadrant.

9. A radio frequency energy transfer device comprising a closed cylindrical cavity resonator, means to excite said cavity resonator with electromagnetic energy in a distribution pattern that is characterized by a plurality of identical modes equally spaced about the axis of said cavity resonator, said modes defining an equal plurality of sectors, a plurality of output means, each of said output means being coupled to one of said sectors, and a vane positioned along the axis of said resonator and mounted to rotate about said axis successively to suppress energy in all but one of said sectors.

10. A device to connect successively an input circuit to a plurality of output circuits comprising a cavity resonator including a cylindrical shell closed at both ends by end plates, said shell and said end plates being formed of electrically conductive material, an input circuit to excite said cavity resonator, said circuit including a coaxial line comprising a flared outer conductor and an inner conductor which is ramiform and extends into said cavity resonator through one of said end plates to form a plurality of radially disposed, equiangularly spaced radiators, said radiators being coplanar with said one end plate and spaced therefrom whereby a plurality of circumferentially spaced, identical electromagnetic fields may be excited in said resonator, circumferentially spaced output circuits coupled through said shell to corresponding spaced electromagnetic fields, and means whereby all but one of said output circuits may be successively decoupled from its corresponding electromagnetic field, said means comprising a plurality of conductive elements radially mounted on a dielectric rod that is axially carried for rotation by said end plates, said elements being so spaced relative to said electromagnetic fields that all but one of said fields are suppressed.

ROBERT KIRKMAN.
MORRIS KLINE.

REFERENCES CITED

The following references are of record in the file of this patent:

UNITED STATES PATENTS

| Number | Name | Date |
|---|---|---|
| 2,197,122 | Bowen | Apr. 16, 1940 |
| 2,197,123 | King | Apr. 16, 1940 |
| 2,210,636 | Schelkunoff | Aug. 6, 1940 |
| 2,280,824 | Hansen et al. | Apr. 28, 1942 |
| 2,301,163 | Koch | Nov. 3, 1942 |
| 2,337,184 | Carter | Dec. 21, 1943 |
| 2,357,314 | Carter | Sept. 5, 1944 |
| 2,433,368 | Johnson | Dec. 30, 1947 |